April 18, 1967  E. L. CUTTER, JR  3,314,322
SHEAR GAGE
Filed July 14, 1965  3 Sheets-Sheet 1
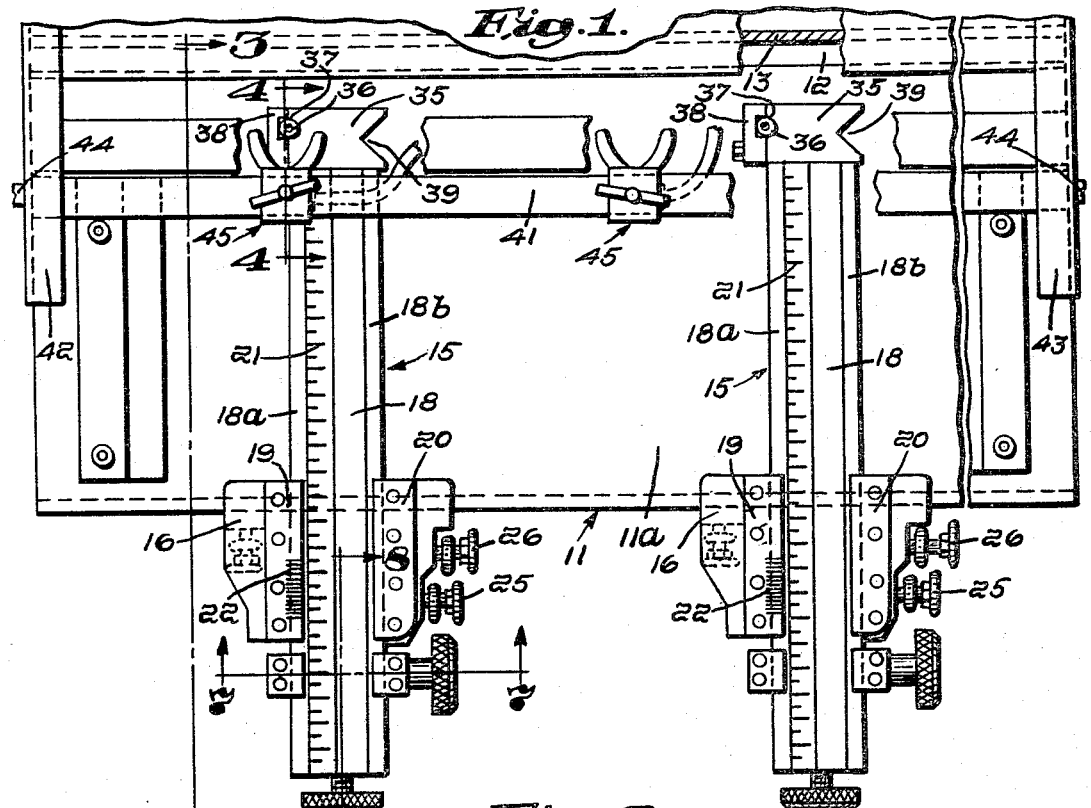
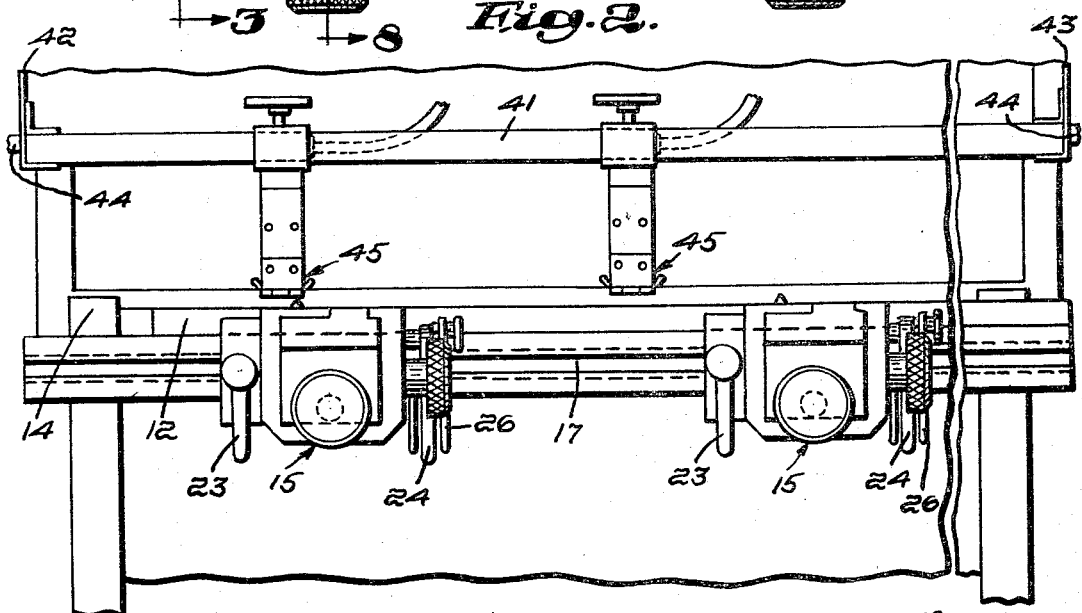
Inventor:
Edward L. Cutter, Jr.
by Arthur D. Thomson
Attorney

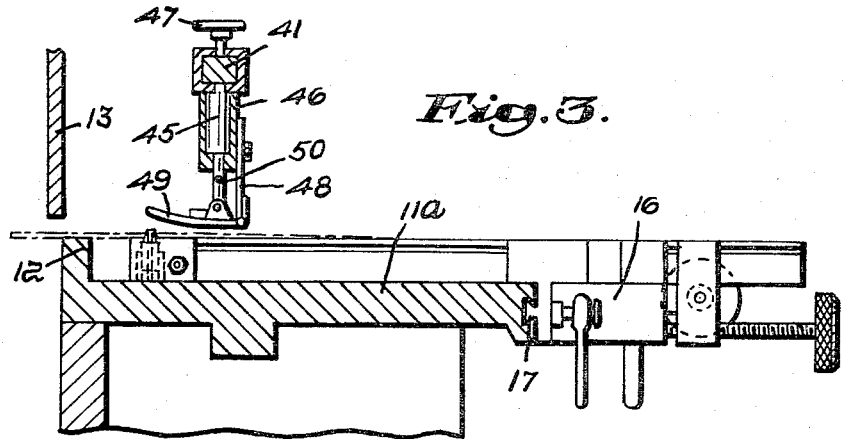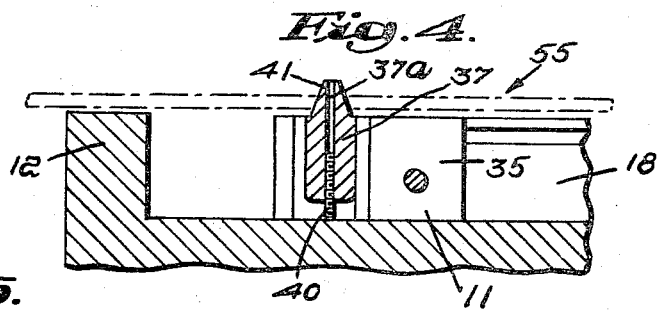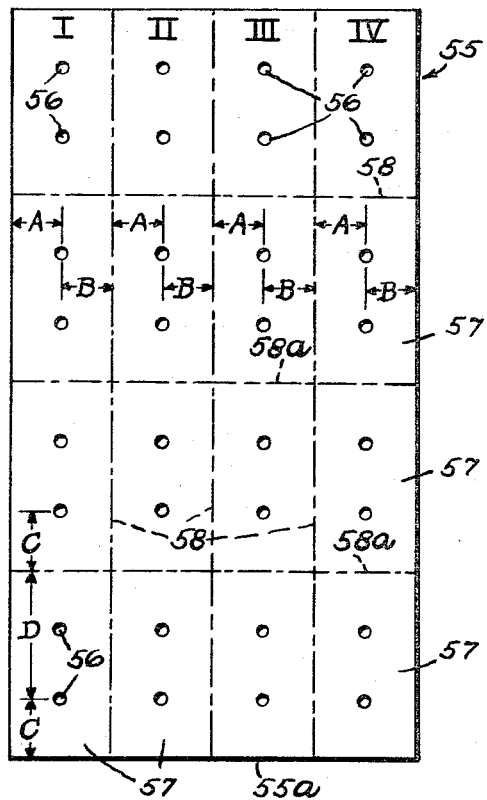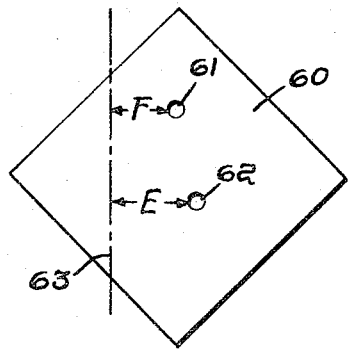

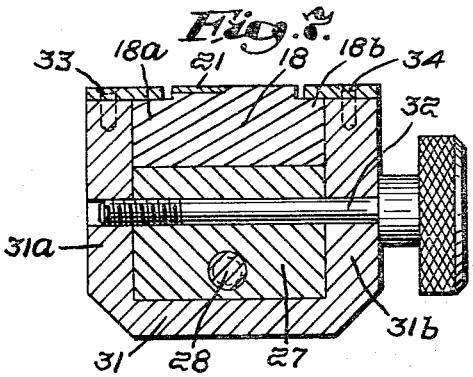
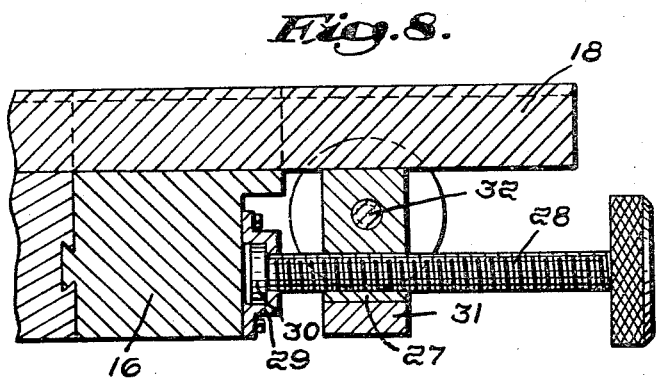
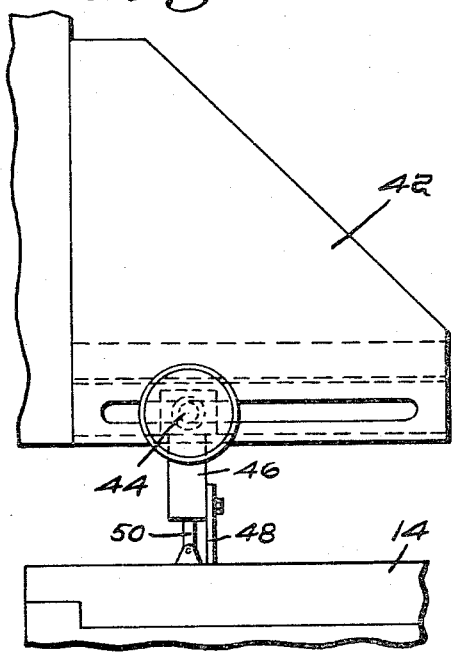
Inventor:
Edward L. Cutter, Jr.
by Arthur D. Thomson
Attorney

3,314,322
SHEAR GAGE
Edward L. Cutter, Jr., 50 Woodland Road,
Milton, Mass. 02186
Filed July 14, 1965, Ser. No. 471,952
5 Claims. (Cl. 83—451)

This invention relates to shearing sheet metal parts, and more particularly to devices for gaging the position of parts, in which holes have previously been punched, under the knife of a shear to shear the edges of the parts to a finished dimension.

The gage here disclosed is suitable both for shearing individual parts and for shearing sheets and strips which have been previously punched with holes for a series of similar parts. The usual way to position a sheet metal part on a shear bed is to engage the rear edge of the piece with the back gage of the shear which has been set to the required distance behind the knife to make the cut come in the right place on the part.

The shearing operation has a slight drawing effect on the edge of the cut edge, so that a portion of the edge projects slightly beyond the true line of the cut. When a strip is sheared into a number of parts, this error is cumulative so that it is not possible to maintain close tolerances in a dimension from the sheared edge to previously formed holes in the parts.

The principal object of this invention is to provide a gaging device which makes it possible to shear any number of like parts in succession from a sheet or strip to close tolerances. Another object is to provide a mechanism which is adapted for accurately shearing parts having oblique edges as well as rectangular parts. Another object is to provide a gage which is simple and easy to operate. Other objects, advantages and novel features will be apparent from the following description.

The gage consists in general of a scale bar mounted to slide transversely and forward and back on the bed of a shear, and a pin removably mounted on the bar. The pin can be set at a distance from the knife of the shear corresponding to the distance between a hole previously punched in the part to be sheared and the desired finished edge. A hold down mechanism which is also slidable transversely and back and forth on the machine, is provided, to engage the sheet in the region of the pin. Parts are sheared from a strip by engaging the selected hole of each piece in succession on the pin and operating the shear. A guide bar perpendicular to the knife of the shear is provided to engage the edge of the strip, or two gages may be used if it is not feasible to use the edge of the strip as a guide.

In the drawing illustrating the invention:

FIG. 1 is a plan view, partly broken away, of the bed portion of a shear, on which gages constructed according to the invention are installed;

FIG. 2 is a front elevation partly broken away, of the bed portion of the shear and the gages;

FIG. 3 is a cross-section taken along line 3—3 of FIG. 1;

FIG. 4 is a fragmentary cross-section taken along line 4—4 of FIG. 1;

FIG. 5 is a plan view of a sheet from which a number of previously punched similar parts are to be sheared;

FIG. 6 is a schematic view illustrating the manner in which an oblique edge is sheared on a piece.

FIG. 7 is an enlarged fragmentary cross-section taken along line 7—7 of FIG. 1;

FIG. 8 is an enlarged fragmentary cross-section taken along line 8—8 of FIG. 1; and FIG. 9 is an end view partly broken away, of a shear with gage installed.

The gage is installed on a shear, generally indicated by the numeral 10, which is of a well known type but has a modified bed 11. The front portion 11a of the bed is recessed below the working level, leaving a narrow raised land 12 at the rear, next to the knife 13. The bed has guide bars 14 along its sides, raised above the plane of land 12. The knife is operated by a mechanism (not shown) of any suitable type.

One or more gage assemblies, generally indicated by the numeral 15, are mounted on the bed of the shear. The gages are all constructed in the same manner.

A carriage 16 is slidably mounted on a way 17 running transversely across the front edge of the bed, and accurately parallel to the knife. A scale bar 18 is mounted on the carriage and slidable in a direction perpendicular to the way 17. The carriage is recessed to receive the bar and the latter has reduced side portions 18a and 18b which are engaged by retainer plates 19 and 20 secured to the carriage. The scale bar carries a scale 21, and plate 19 is marked with a vernier 22 which cooperates with the scale. The carriage is equipped with a pair of clamps 23 and 24 to lock it in way 17, and a pair of clamps 25 and 26 to lock the scale bar to the carriage.

A block 27 is threaded onto a lead screw 28 having an end flange 29 secured by a cap 30 to carriage 16. Block 27 is received in a U-shaped block 31 having upstanding legs 31a and 31b. A screw 32 passes freely through leg 31b and block 27 and is threaded into leg 31a. Scale bar 18 passes slidably through block 31 and its edge portions 18a and 18b are engaged by retainer plates 33 and 34. There is some side clearance between block 27 and legs 31a, 31b so that by tightening screw 32, the legs can be jammed against bar 18 to lock it in the block assembly.

Mounted on the rear end of bar 18, that is the end nearest the knife of the shear, is a block 35 having a V-notch 36 in which a pin 37 is clamped by means of a retainer block 38. Preferably block 35 has a second notch 39 to accommodate pins of larger diameters as will be explained. The pin 37, as shown in detail in FIG. 4, has a conical top portion 37a. A set screw 40 is threaded into the bottom of the pin and rests on the bed 11 of the shear. By turning the set screw, the height of the pin above the bed can be adjusted. The pin is here illustrated as having a hole 40 all the way through so that a tool can be inserted from the top to adjust screw 40. In small pins, it is preferable to leave the conical portion solid and adjust the screw from the bottom.

A bar 41 extends across the shear above the bed and is slidably supported on slotted brackets 42 and 43 mounted on the frame of the machine. At each end the bar has a screw knob 44 to lock the bar on the brackets. One or more hold down mechanisms, generally indicated by the numeral 45, are mounted to slide transversely on bar 41. As shown in FIG. 3, a typical hold down mechanism consists of a housing 46, through which bar 41 passes, a clamp 47, a bracket 48 attached to the housing, and a presser foot 49 hinged to the housing. The presser foot is swung up and down, through a suitable linkage 50, by a pneumatic cylinder 51 which may be actuated in any well-known manner. A hold down mechanism is provided for each gage assembly. It is understood that the shear may also be provided with the usual types of hold down mechanisms in the region of the knife.

FIG. 5 illustrates a typical sheet 55 in which sets of holes 56, which are finished holes for a number of similar parts 57, have been punched. The sheet is first sheared into strips along lines 58, and each strip is then sheared along lines 58a to form the individual parts. If this were done using the back gage in the usual manner, the back gage would be set to the width of the strips. Assuming that the left hand edge of the sheet is at the correct distance A from the holes in strip I, the line 58 between strips I and II would be correctly positioned for shearing. The shearing action produces a slight elongation, referred to as "shear pick-up." When the cut edge of strip II was set against the back gage for the next shearing operation the cut would be made slightly to the left of the line 58 between strips II and III. Dimension A of strip III would thus be oversize, by the amount of the shear pick-up, and dimension A of strip IV by twice that amount. The error would increase, in each successive shearing operation, by the amount of the shear pick-up. Dimension B, from the holes to the right hand edge of each strip would be undersize by a corresponding amount. In shearing the strips into pieces the same cumulative errors would occur in dimensions C and D.

To shear the sheet with the new gage here described, the operator selects a pin 37 of appropriate diameter to fit into one of the holes 56. As shown in FIG. 4, the conical portion of the pin should be slightly larger at the base than the hole, so that strip does not bottom on the gage bar. This insures that the pin will center in the hole. The set screw 40 is adjusted so that the strip lies slightly above the bar. The pin is clamped in notch 36, or if too large, in notch 39, of one of the gage assemblies.

If the side edge 55a of the piece is known to be true with respect to the pre-punched holes, a single gage assembly can be used. The carriage 16 is moved sidewise until edge 55a engages one of the edge guide bars 14 when the selected hole is centered on the pin. The carriage is then locked by clamps 23 and 24.

To position the sheet under the shear, the scale bar 18 is moved so that the pin is spaced from the shear by the desired finished dimension between the leading edge of the first piece and the selected hole, for example dimension "A." The scale 21 is calibrated to give the distance of the center of the pin from the cutting edge of the knife. The pin may be roughly positioned by sliding bar 18 manually through the carriage. To make fine adjustments, block 31 is locked to the bar 18 by turning screw 32, and the lead screw 28 is used. When the position of the pin in the front to rear direction of the bed has been set, bar 18 is locked to the carriage by clamps 25, 26. The hold down assembly 45 is placed so that presser foot 49 straddles the pin 37.

If necessary, the left hand edge of the sheet may be trimmed to the dimension A by engaging the selected hole in strip I over the pin. The hold down mechanism may be lowered manually or automatically with each stroke of the shear. To cut off strip I, the operator lifts the sheet and advances it so that the corresponding hole in strip II engages the pin. The rest of the strips are sheared in the same manner. It will be noted that the edge to be cut is positioned each time with reference to one of the adjacent holes so that no change occurs in dimensions A and B from one strip to another.

The strips are sheared into individual parts, by setting the gage so that the pin is spaced from the knife by one of the vertical hole to edge dimensions, for example, dimension "C." The carriage is set so that one of the long edges of a strip will engage the side guide bar, and a strip is fed longitudinally through the shear to cut off the pieces along line 58a. The dimensions C and D of all the pieces will be the same.

If a sheet or piece does not have a true edge at right angles to the edge to be sheared, two gages may be used and their pins positioned according to the dimensions from two selected holes to the edge to be sheared. In this case, the gage bar carriages are positioned laterally so that the piece does not touch the side guide bars 14. Pieces which do not have an adequate bearing area along the edge to use the side bars, and pieces with oblique cuts can also be sheared by using two gages. For example, FIG. 6 illustrates a piece 60 having holes 61 and 62, which is to be sheared along line 63. Two gages are set with their pins spaced by dimensions E and F, which need not be the same, from the knife. The lateral spacing of the two carriages is set by engaging one hole on the appropriate pin and moving the other gage sidewise to engage its pin with the other hole.

Once the gage is set up, a run of similar parts may be sheared as quickly and easily as by previous methods. As each part is positioned individually with reference to one or more of its finish holes, all the parts in a run are uniform, and the accuracy of the hole to edge dimensions can be maintained within close tolerances.

The gages do not interfere with use of the shear in the usual manner, for example, to shear pieces which are not prepunched. With the pins removed, the gage bars serve as supports, and a piece or sheet can be positioned by the back gage as on a shear with a continuous bed.

What is claimed is:

1. A gage, for a shear having a bed and a knife, comprising a gage bar mounted on said bed and slidable transversely of said bed and toward and away from said knife, an upwardly projecting pin mounted on said gage bar, and a hold down mechanism slidable above said gage bar transversely of said bed and toward and away from said knife, said mechanism having a forked presser foot adapted to straddle said pin.

2. A gage, for a shear having a bed and a knife, comprising a gage bar slidable transversely of said bed and toward and away from said knife, said bed having a recessed forward portion and a raised land adjacent said knife, said bar being mounted on said forward portion and said land and bar having upper surfaces at the same level, and an upwardly projecting pin mounted on said gage bar and having a hole engaging region extending above said level.

3. A gage, for a shear having a bed with a forward edge and a knife to the rear of said bed, comprising a carriage mounted on said edge and slidable transversely of said bed, a gage bar mounted on said carriage and slidable thereon toward and away from said knife, a lead screw mounted on and bearing against said carriage, a block threaded on said lead screw and slidable on said bar, and means for locking said block to said bar, so that said bar is drawn toward and away from said knife by rotation of said screw.

4. A gage, for a shear having a knife and a bed with a forward edge disposed remotely from said knife, comprising a gage bar mounted on and slidable transversely along said bed, said bed having a recessed forward portion and a raised land adjacent said knife, said bar being of a length to extend substantially across the major part of said bed from said forward edge to said knife and having a rear end disposed toward said knife, and an upwardly projecting pin mounted on said bar adjacent said rear end, said bar being slidable toward and away from said knife.

5. A gage for a shear having a knife and a bed with a forward edge disposed remotely from said knife, comprising a gage bar mounted on and slidable transversely along said bed, said bar being of a length to extend substantially across the major part of said bed from said forward edge to said knife and having a rear end disposed toward said knife, said bar being slidable toward and away from said knife, and an upwardly projecting pin mounted on said bar adjacent said rear end, said gage being intended for use in shearing a work piece having a finished hole of predetermined radius, and said pin being of a radius larger than that of said hole and having a conical upper portion adapted to engage in said hole and being movable up and down.

(References on following page)

References Cited by the Examiner

UNITED STATES PATENTS

| | | | |
|---|---|---|---|
| 1,462,871 | 7/1928 | Rosenberg | 83—468 |
| 1,712,269 | 5/1929 | Hanauer | 83—33 |
| 2,131,359 | 9/1938 | Seffzig | 83—33 |
| 2,766,784 | 10/1956 | Antczak | 143—171 |
| 2,785,747 | 3/1957 | Le Gate | 83—451 |

FOREIGN PATENTS 370,646   3/1923   Germany.

WILLIAM W. DYER, Jr., *Primary Examiner.*

ANDREW R. JUHASZ, *Examiner.*

J. M. MEISTER, *Assistant Examiner.*